United States Patent [19]

Bollinger

[11] Patent Number: 4,533,482

[45] Date of Patent: Aug. 6, 1985

[54] HYDROGENATED DIOLEFIN-LOWER ALKYL ACRYLATE OR METHACRYLATE VISCOSITY INDEX IMPROVING COPOLYMERS FOR LUBRICATING OILS

[75] Inventor: Joseph M. Bollinger, North Wales, Pa.

[73] Assignee: Rohm and Haas Company, Philadelphia, Pa.

[21] Appl. No.: 454,749

[22] Filed: Dec. 30, 1982

[51] Int. Cl.$^3$ .............................................. C10M 1/28
[52] U.S. Cl. ............................... 252/56 R; 525/330.3; 525/338; 585/12
[58] Field of Search .................... 252/56 R; 525/330.3, 525/338; 585/12

[56] References Cited

U.S. PATENT DOCUMENTS 2,693,461  11/1954  Jones ................................. 525/330.3
4,069,180   1/1978  Chalmers ......................... 525/330.3
4,207,409   6/1980  Ladenberger et al. ............. 525/338

*Primary Examiner*—Jacqueline V. Howard
*Attorney, Agent, or Firm*—Marc S. Adler

[57] ABSTRACT

This invention relates to hydrogenated diolefin-lower alkyl acrylate or methacrylate copolymers and the use of these copolymers to improve the viscosity index (VI) of lubricating oils. The preferred copolymer is a fully hydrogenated, high molecular weight copolymer of 1,3-butadiene and methyl methacrylate containing at least about 71 mole percent 1,3-butadiene. A pour point depressant, VI improving polymer additive for lubricating oils is provided by incorporating a higher alkyl methacrylate in the copolymer. Further, a dispersant VI improving copolymer for lubricating oils and a dispersant for hydrocarbon fuels prepared by graft polymerizing a polar, nitrogen-containing graft monomer onto the VI improver or pour point depressant VI improver is also provided.

15 Claims, No Drawings

HYDROGENATED DIOLEFIN-LOWER ALKYL ACRYLATE OR METHACRYLATE VISCOSITY INDEX IMPROVING COPOLYMERS FOR LUBRICATING OILS

BACKGROUND OF THE INVENTION

This invention relates to lubricating oils containing a VI improving, hydrogenated, high molecular weight copolymer of a diolefin and a lower alkyl methacrylate or lower alkyl acrylate. Incorporating a higher alkyl methacrylate in the monomer charge of the copolymer provides a pour point depressant, VI improver for lubricating oils. Graft polymerizing the hydrogenated copolymer with a polar, nitrogen-containing graft monomer provides a dispersant, VI improving additive for lubricating oils and a dispersant for hydrocarbon fuels.

Various additives have been proposed to impart beneficial properties to lubricating oils and hydrocarbon fuels. These properties include enhanced viscosity, viscosity-temperature relationships, dispersancy, pour point depression, oxidation inhibition, anti-rust, and anti-wear properties. The ability of a lubricant to provide adequate flow at low temperatures and good film thicknesses at high temperatures is referred to as a good viscosity-temperature relationship. Dispersancy refers to the ability of a lubricant to prevent settling of sludge or deposits which are formed by the direct oxidative degradation of the lubricant or as the result of complex reactions of gasoline and blowby gases in automotive crankcases. If these deposits are not dispersed in the lubricant they will settle out and cause the plugging of filters or possibly the sticking of moving parts where tight tolerances are involved. In addition, dispersants are added to gasoline and middle distillate fuels, such as home heating oils, diesel fuels, and jet fuels because these fuels tend to deteriorate oxidatively upon standing to form gummy deposits. In the case of gasoline, such gummy residues are deposited in the carburetor, making control of air-fuel ratio impossible.

The major types of conventional lubricant additives include polymethacrylates, olefin copolymers, and hydrogenated diene-styrene polymers.

Polymethacrylates exhibit excellent viscosity-temperature relationships in lubricating oil as a result of their differing solubility in lubricating oil at high and low temperatures. Polymethacrylate additives may be modified to impart dispersancy by graft polymerizing polar, nitrogen-containing monomers onto the polymethacrylate backbone.

Olefin copolymers, such as ethylene-propylene copolymers, are more efficient thickeners for lubricating oil than polymethacrylates. The improved thickening efficiency allows them to be effective at lower concentrations in lubricating oil than polymethacrylates. The improved thickening efficiency of olefin copolymers is a function of the high percentage of their molecular weight in the polymer backbone as compared to polymethacrylates which have a lower percentage of their molecular weight in the backbone and a higher percentage of their molecular weight in the side-chain alkyl groups. Olefin copolymers may also be modified, by a different graft polymerization process than that used to graft polymerize polymethacrylates, to incorporate a dispersant functionality onto the olefin copolymer backbone. While olefin copolymers are excellent thickeners, they do not possess the excellent viscosity-temperature relationships of polymethacrylates. In addition, olefin copolymers do not exhibit pour point depression, and the addition of sufficient quantities of conventional pour point depressant additives to the olefin copolymer may result in an incompatible lubricating oil concentrate.

Hydrogenated diene-styrene copolymer additives are also efficient thickeners for lubricating oil but are more oxidatively unstable than polymethacrylates and do not possess the excellent viscosity-temperature relationships of polymethacrylates.

Accordingly, it would be apparently advantageous to combine the beneficial properties of polymethacrylates with the beneficial properties of olefin copolymers to create a lubricating oil additive having the best features of each type of additive. Physical mixtures of polyolefins and polymethacrylates are, however, incompatible. Mixtures containing more than about 5 weight percent polyolefin separate into two phases in lubricating oil and this incompatibility, in most instances, renders simple physical combination ineffective as an oil additive.

PRIOR ART

German Offenlegungsscrift No. 2,905,954 is directed to a phase stabilizer or emulsifier composition which compatibilizes polymethacrylates and olefin copolymers in lubricating oil. The graft and block emulsifier compositions have sequences that are compatible with the olefin copolymer and other sequences that are compatible with polymethacrylates. The emulsifier composition must be present at levels in excess of 5 weight percent to compatibilize polymethacrylates and olefin copolymers. However, these compatibilized blends must be used in concentrations of about 2.0% to impart an effective viscosity index to lubricating oils. In addition to the need for such high concentrations, the borderline pumping temperature of lubricating oils containing an effective amount of compatibilized polymethacrylate-olefin copolymer is not as low as can be achieved with the copolymers of the present invention.

U.S. Pat. No. 3,621,004 relates to lubricating oil compositions containing polymeric compounds having viscosity improving and dispersant properties. These polymeric compounds are formed by copolymerizing one or more olefins containing two to six carbon atoms per molecule with one or more alkyl esters of unsaturated carboxylic acids, preferably containing eight or more carbon atoms per molecule, for example, lauryl methacrylate, and one or more esters of unsaturated carboxylic acids, in which the part of the molecule derived from the alcohol contains at least one free hydroxyl group, such as beta-hydroxy ethyl methacrylate. Programmed copolymerization or copolymerization to low conversion is necessary to ensure that the ratio between the concentration of the monomers in the mixture to be polymerized remains constant during polymerization. The copolymer is then reacted with cyclic ethers, for example ethylene oxide, to form the lubricant additive.

British Pat. No. 1,112,749 also discloses polymeric VI improvers and/or thickeners for lubricating oil. These additives are formed by copolymerizing one or more mono- or di-olefins, having six carbon atoms per molecule or less, with either one or more alkyl esters of unsaturated monobasic carboxylic acids, preferably where the alkyl group of at least one ester contains eight or more carbon atoms, or with one or more alkyl esters of unsaturated polybasic carboxylic acids. Specific molar ratios of the monomers are required to minimize the undesirable formation of homopolymers of the esters and the olefins. The preferred additive is a copolymer of ethylene or butadiene and lauryl methacrylate or di(2-ethyl hexyl)itaconate.

The British '749 patent and U.S. Pat. No. 3,621,004 do not disclose that copolymers of ethylene and methyl methacrylate only can be effective as lubricating oil additives. This is because, as the number of the carbon atoms in the alkyl group of the methacrylate component decreases, it would be expected that the solubility of the resulting copolymer in lubricating oil would decrease. There are no reported attempts at successfully forming copolymers of olefins and methyl methacrylate or lower alkyl acrylates which are effective as lubricating oil additives. The British '749 patent also discloses partially hydrogenated copolymers of butadiene and lauryl methacrylate; however, the VI improvement obtained with such an additive is less than satisfactory.

French Pat. No. 2,273,057 discloses low number average molecular weight (less than 10,000), hydrogenated butadiene-methyl methacrylate copolymers. These copolymers are disclosed as being useful as flow improvers for hydrocarbon liquids. They are not, however, disclosed as being useful as VI improving additives for lubricating oils at high and low temperatures. Their function is to modify the crystallinity of alkanes in hydrocarbon liquids at low temperatures.

German Offenlegungsscrift No. 2,322,079 discloses block copolymer additives for lubricating oils. These additives are copolymers of hydrogenated blocks of conjugated dienes, such as polybutadiene or polyisoprene, and optionally hydrogenated blocks of at least one mono-alkenyl pyridine, acrylate, methacrylate, acrylonitrile, and alpha-olefin oxide. The copolymer preferably contains 10 to 99 weight percent and more, preferably 40 to 97 weight percent, of the hydrogenated blocks of conjugated dienes. These sequential anionic polymerized block copolymers are structurally different and are prepared by a different process than the random copolymers of the present invention. Because the block copolymers have sequences of homopolymers coupled together, it would be expected that these homopolymers could associate together to form aggregates and result in different solubility properties than the copolymers of the present invention.

*Macromolecules*, Vol. 14, No. 6, 1981, pp. 1613–16, "Synthesis of a Sequence-Ordered Copolymer: Hydrogenation of Alternating Butadiene-Methyl Methacrylate Copolymer", Yokota and Hirabayashi, discloses synthesizing perfectly alternating copolymers of butadiene and methyl methacrylate and a process for hydrogenating such copolymers. These hydrogenated, alternating copolymers would not be expected to be soluble in lubricating oils, below about 50° C., as a result of very high polarity and possibly from crystallinity arising from the regular nature of the copolymer. Accordingly, these copolymers would not be expected to be effective VI improving additives.

Hydrogenated butadiene-methyl methacrylate copolymers would be expected to closely resemble ethylene-methyl methacrylate copolymers. I have found that ethylene-methyl methacrylate copolymers, prepared by emulsion polymerization at high pressure greater than 100 psig, are too insoluble in lubricating oil to be useful as VI improvers. The insolubility of ethylene-methyl methacrylate copolymers in oil is probably the result of the crystallization of blocks of ethylene. These blocks likely occur because of the greatly differing reactivities of ethylene and methacrylate esters. I have also found that high molecular weight, hydrogenated polybutadiene, prepared by emulsion polymerization techniques, and low molecular weight hydrogenated polybutadiene, prepared by free radical polymerization techniques, are also too insoluble in oil to be effective additives. The partial insolubility of hydrogenated polybutadiene is also likely due to polyethylene-type crystallinity. In addition, high molecular weight polymethylmethacrylate is highly polar and is essentially insoluble in lubricating oils which have little polarity.

SUMMARY OF THE INVENTION

I have unexpectedly found that high molecular weight, catalytically hydrogenated copolymers of conjugated diolefins, having six carbon atoms or less per molecule, and alkyl acrylates or alkyl methacrylates and mixtures thereof, where the alkyl group of said acrylate or methacrylate contains eight carbon atoms or less per molecule, are soluble in lubricating oil and provide an effective VI improving additive for lubricating oils.

It is an object of this invention to provide a novel VI improving copolymer additive for lubricating oils which possesses the desirable properties of conventional polymethacrylate and olefin copolymer oil additives.

It is also an object of this invention to provide a high molecular weight, catalytically hydrogenated copolymer of a conjugated diolefin, having six carbon atoms or less per molecule, a lower alkyl acrylate or alkyl methacrylate where the alkyl group of the acrylate or methacrylate contains eight carbon atoms or less per molecule, and one or more higher alkyl methacrylates, where the alkyl groups of the higher alkyl methacrylates contain from about 12 to about 20 carbon atoms per molecule, which is effective as a pour point depressant, VI improver for lubricating oils.

It is a further object of this invention to graft polymerize a polar, nitrogen-containing graft monomer onto the backbone of a hydrogenated diolefin-lower alkyl acrylate or lower alkyl methacrylate copolymer to provide a dispersant, VI improver for lubricating oil and hydrocarbon fuels.

Other objects and advantages of the present invention will become apparent in the course of the following detailed description of the invention.

DETAILED DESCRIPTION OF THE INVENTION

The high molecular weight, hydrogenated copolymers of this invention are effective VI improvers for lubricating oils and can be modified to prepare multi-function, pour point depressant and dispersant VI improvers. These VI improvers are hydrogenated copolymers of conjugated diolefins, having six carbon atoms or less per molecule, and lower alkyl acrylates or lower alkyl methacrylates, where the alkyl group contains eight carbon atoms or less per molecule.

The conjugated diolefin monomers useful in this invention include 1,3-butadiene, cis and trans 1-methyl-1,3-butadiene (piperylene), 2,3-dimethyl-1,3-butadiene, and 2-methyl-1,3-butadiene (isoprene). The preferred conjugated diolefin monomer is 1,3-butadiene.

The lower alkyl acrylate and lower alkyl methacrylate comonomers include methyl, ethyl, butyl, propyl, isopropyl, sec-butyl, isobutyl, t-butyl acrylate or methacrylate, and mixtures thereof. The preferred lower alkyl acrylate or methacrylate is methyl methacrylate.

The copolymers of this invention are prepared by any standard polymerization technique capable of forming a sufficiently high molecular weight copolymer of a diolefin and a lower alkyl acrylate or lower alkyl methacrylate. Emulsion polymerization has been found to be the preferred method for preparing random copolymers of a diolefin and lower alkyl acrylate or methacrylate having a sufficiently high molecular weight. Emulsion polymerization preferably involves preparing a first aqueous surfactant mixture of deionized water, an anionic surfactant, for example, sodium lauryl sulfate, and a reducing portion of a redox initiator system, for example, tetrasodium pyrophosphate and ferrous sulfate heptahydrate. The monomers and the oxidation portion of the redox initiator system, for example, cumene hydroperoxide, t-butyl hydroperoxide, or diisopropyl benzene hydroperoxide, are added to the first aqueous surfactant mixture under a nitrogen atmosphere. Chain transfer agents may also be added to the monomer mixture. Free radical generating polymerization initiators other than the redox systems described above can also be used in the emulsion polymerization process. These initiators include azoinitiators, such as azobis-(isobutyronitrile) and 2,2'-azobis (2,4-dimethyl-4-methoxy) valeronitrile manufactured by E. I. duPont under the trademark Vazo 33 ®, and water-soluble persulfate initiators, such as sodium persulfate and ammonium persulfate optionally with reducing agents. Whichever initiator system is selected, it is important that the system produces free radicals at a suitable rate at the temperature selected for the polymerization reaction.

The ratio of the monomer mixture in the feed approximates the desired ratio of the polyolefin to polyacrylate or polymethacrylate units in the final copolymer. The emulsion reaction mixture is maintained at a polymerization temperature of $-10°$ C. to $60°$ C., preferably at $5°$ C. to about $40°$ C., and more preferably at around $20°$ C. to about $30°$ C. Once polymerization has begun, additional monomers are slowly added at a constant rate to the reaction mixture. Simultaneously, a second aqueous surfactant mixture containing a nonionic surfactant, such as Triton X-405 ® or Triton N-100 ® (trademark of Rohm and Haas Company), and additional anionic surfactant are gradually added to the reaction mixture to form the proper emulsifying environment for the copolymerization. The reaction is allowed to continue to high conversion on the order of about 50–90%, and preferably 70–90%, of complete conversion. The emulsion copolymer is either precipitated from the solution as by methanol-containing hydroquinone, or isolated from the mixture as by extraction and azeotropic distillation. The precipitated emulsion copolymer is then washed and dried.

I have found that methyl methacrylate is the preferred lower alkyl methacrylate comonomer for emulsion copolymerization with the conjugated diolefin monomers. Methyl methacrylate is partially soluble in water and has a favorable reactivity ratio with the conjugated diolefins. This favorable reactivity ratio allows for the formation of copolymers of substantially uniform composition compared to the monomer feed.

The emulsion polymerization conditions used, and especially the emulsion polymerization temperature, has an important affect on the way in which the conjugated diolefin monomer polymerizes. In turn, the way in which the conjugated diolefin monomer polymerizes has an affect on the solubility of the resulting copolymer in a lubricating oil. When 1,3-butadiene polymerizes, the polybutadiene formed is said to have a microstructure. A microstructure is a term used to differentiate the stereochemistry and arrangement of the monomer units from the macrostructure. The microstructure of polybutadiene contains cis 1,4-polybutadiene, trans 1,4-polybutadiene, and vinyl 1,2-polybutadiene. Based on the literature (J. L. Binder, *Ind. Eng. Chem.*, 46, 1727 (1954), "Microstructure of Polybutadience and Butadiene Styrene Copolymers", the microstructure of polybutadiene may be estimated at various emulsion polymerization temperatures. At an emulsion polymerization temperature of $-5°$ C., the polybutadiene microstructure contains about 13% cis, 75% trans, and 12% vinyl. At an emulsion polymerization temperature of about $50°$ C., the polybutadiene microstructure contains about 18% cis, 65% trans, and 17% vinyl. Raising the emulsion polymerization temperature favors the formation of vinyl polybutadiene and cis polybutadiene at the expense of the formation of trans polybutadiene. Increasing the amount of vinyl polybutadiene contained or enchained in the microstructure is desirable when preparing a copolymer which must be soluble in a lubricating oil. Increasing the vinyl polybutadiene enchainment in the microstructure increases the ethyl branches in the polymer reducing molecular interactions, melting point, and the possibility of polyethylene-type crystallinity from occurring, which in turn reduces the possibility of decreasing the solubility of the copolymer additive in a lubricating oil. However, increasing the polymerization temperature above about $40°$ C. reduces the extent of possible monomer conversion without introducing too much crosslinking. Accordingly, I have found that the preferred emulsion polymerization temperature range is about $5°$ C. to $40°$ C. in order to form copolymers which, upon subsequent hydrogenation, are effective VI improvers for lubricating oils.

I have also found that the ratio of the concentration of the conjugated diolefin monomer to the concentration of the lower alkyl acrylate or lower alkyl methacrylate monomer in the monomer feed is important in minimizing polyethylene-type crystallization without introducing excessive polyacrylate or polymethacrylate polarity. Hydrogenated copolymers containing a molar ratio of polybutadiene to polyacrylate or polymethacrylate of about 2:1 to less than about 2.5:1 are not effective as commercial VI improvers for lubricating oils. Although these copolymers improve the viscosity index of a lubricating oil, the copolymers tend to settle out of solution upon storage. This storage instability may be a function of polymethylmethacrylate polarity or polyethylene-type crystallinity. Hydrogenated copolymers of methyl methacrylate and at least 71 mole percent and less than 100%, and preferably less than about 98%, hydrogenated 1,3-butadiene are soluble in lubricating oil, storage stable, and effective VI improvers for lubricating oils at low use levels.

As the number of carbon atoms per molecule in the alkyl group of the lower alkyl acrylate or lower alkyl methacrylate monomer is increased, the required concentration of the diolefin monomer in the monomer feed can be reduced to below 71 mole percent without adversely affecting the solubility and storage stabilty of the hydrogenated copolymer in a lubricating oil. However, reducing the diolefin monomer concentration below 71 mole percent reduces the efficiency of the copolymer as a VI improver. When the diolefin content in the monomer feed is reduced to slightly less than 71 mole percent, a mixture of low carbon number alkyl acrylate and methacrylate monomers, where the alkyl group contains eight or less carbon atoms per molecule, such as methyl acrylate, and methyl methacrylate can be used to prepare a hydrogenated copolymer which is soluble, storage stable, and effective as a VI improver.

The molecular weight of the copolymers prior to hydrogenation may vary over a wide range of molecular weights, for example, from about 100,000 to about 10,000,000 weight average molecular weight and from about 10,000 to about 5,000,000 number average molecular weight. The molecular weight of the copolymer may be preferably controlled by the inclusion of various chain transfer agents having a sulfur-hydrogen bond, such as n-dodecyl mercaptan, t-dodecyl mercaptan, t-butyl mercaptan, n-hexyl mercaptan, and the like, with the monomer mixture during the copolymerization process at concentrations of about 0.1% up to about 0.4% on weight of total monomers. Less active chain transfer agents, such as p-diisopropylbenzene, toluene, and 100 N-oil, may also be used at concentrations of about 5 to 10%. N-oil refers to a neutral oil containing no additives prepared by vacuum fractionating a 375°-550° C. cut of crude petroleum distillate followed by decolorization and dewaxing. The prefix, i.e. 100 or 150, refers to the Saybolt viscosity (Saybolt Universal Seconds [SUS]) at 100° F.

When the concentration of the diolefin monomer in the monomer mixture to be polymerized exceeds 71 mole percent, composition drift, that is, the difference between the composition of the monomer mixture and the composition of the resulting copolymer, is not significant. The composition of the resulting copolymer closely approximates the composition of the monomer mixture. The absence of significant composition drift allows copolymerization to proceed to high conversions, on the order of 70-90% of complete conversion, without the need for varying the composition of the monomer mixture added during copolymerization (variable feed addition) or programmed copolymerization to low conversion as taught in the art. While complete conversion without variable feed addition is possible, it is not desirable because, at close to complete conversion, substantial crosslinking of the copolymer may occur. Substantial crosslinking of the high molecular weight copolymer is undesirable as it makes subsequent handling of the copolymer extremely difficult. Moderate crosslinking of the high molecular weight copolymer, as determined by a reciprocal swelling volume (see J. Bardwell and C. A. Winkler, Can. J. Res., 27 B, 116, 128 [1949]) less than about .0.01 to .0.05 in solvent, may be tolerated as such moderate crosslinking does not result in a copolymer which cannot be handled after filtration to remove the crosslinked polymer or upon subsequent degradation to a lower molecular weight. It is desired, however, to maximize the extent of copolymerization while minimizing crosslinking to form a substantially soluble copolymer.

The high molecular weight copolymers of this invention are catalytically hydrogenated to form a hydrogenated, VI improving copolymer. The copolymer may be transferred directly from an aqueous emulsion, when the copolymer is prepared by an emulsion polymerization process, into a hydrogenation solvent by extraction. Alternatively, the copolymer may be precipitated from the emulsion and dried before being redissolved in the hydrogenation solvent. Combinations of extraction and precipitation can also be used to isolate the copolymer and transfer it to the hydrogenation solvent. The hydrogenation solvent is any inert aromatic or saturated hydrocarbon solvent in which the copolymer can dissolve, such as toluene, cyclohexane, benzene, xylene, methyl cyclohexane, tetralin, decalin, t-butyl benzene, dimethyl cyclohexane, ethyl benzene, and the like. A material capable of donating hydrogen, such as hydrogen gas or cyclohexene, tetralin, limonene, vinyl cyclohexene, and the like, and a catalyst are added to the copolymer solution in a reactor under a nitrogen atmosphere at about 25°-40° C. Hydrogen gas is the preferred hydrogen donating material. When hydrogen gas is used, the preferred hydrogenation catalyst is a solution of an anhydrous nickel, iron, or cobalt salt, such as nickel di(acetylacetonate), an anion of pentanedione, nickel di(2-ethyl hexanoate), nickel di(cyclohexane butyrate), or nickel di(naphthenate), and the like. Nickel di(acetylacetonate) and triethylaluminum, a reducing agent, in toluene is the preferred hydrogenation catalyst system when hydrogen gas is used. Other reducing agents which may be used with the hydrogenation catalysts include triisobutylaluminum, n-butyllithium, and trimethylaluminum. When a hydrogen donating material other than hydrogen gas is used, a catalyst containing about 10% by weight of a Group VIII metal, such as palladium, platinum, nickel, and the like on a carbon substrate, can be used as the hydrogenation catalyst.

The reactor containing the polymer, hydrogen supplying material, and catalyst solution is pressurized to about 15 psig to 1000 psig, preferably 100 psig to 400 psig. The reactants and catalyst are stirred and heated to between 40° C. and 120° C. The temperature of the reaction mixture will increase by about 10°-30° C. as the result of the exothermic nature of the hydrogenation reaction. The hydrogenation reaction is completed when less than 5% unsaturation and preferably less than 2% unsaturation as determined by NMR and/or IR spectra. The remains as determined by NMR and/or IR spectra. The substantially completely hydrogenated copolymer is freed of catalyst residues by washng with an acid, for example, citric or hydrochloric acid. The polymer is then stripped (distilled rapidly) of solvent and volatile components and preferably formulated by addition to neutral oil to provide a solution of the hydrogenated VI improving copolymer in oil. A 100% solid hydrogenated copolymer can also be prepared and added directly to lubricating oil; however, a concentrate in N-oil is the conventional way of supplying the polymer as it is easily handled and dissolves rapidly in a lubricating oil.

When polymeric VI improvers are subjected to severe mechanical stresses of operating equipment, the polymer may be degraded, thus diminishing the favorable influence which such additives exert on viscosity-temperature properties of a lubricant. Polymers which resist this tendency to mechanically degrade in service are said to have good shear stability. The ability of a VI improver to resist mechanical degradation with use is dependent on a number of factors, one of which is molecular weight. A very high molecular weight polymer, although imparting initially high effective control of viscosity-temperature properties, will be very substantially degraded in service and thus lose much or even all of its effect.

The hydrogenated, not previously degraded, copolymers of the present invention may be too high in molecular weight to be usable, even though they are good VI improvers, that is, they have poor shear stability. Means to bring the molecular weight down to the desirable range, where shear stability will be good, are readily available. It preferably requires only mechanical or sonic degradation of the product to adjust the molecular weight to the preferred molecular weight.

The copolymer may be degraded, by mechanical or sonic degradation, to improve its shear stability by reducing its molecular weight to the desired range of about 60,000 to about $1.6 \times 10^6$ weight average molecular weight, and about 20,000 to about 400,000 number average molecular weight, either prior to, or subsequent to, hydrogenation. The preferred weight average molecular weight ranges from about 80,000 to about one million.

Any convenient means of degradation, such as in a gear pump or extruder, is acceptable, but homogenization is preferred. In a homogenization process the polymer is forced at very high pressure through a device which utilizes variously designed throttle valves and narrow orifices. Such a device can generate shear rates of 5000 sec$^{-1}$ and more preferably of between 10,000 and about 1,000,000 sec$^{-1}$. Commercial devices such as that from the Manton-Gaulin Manufacturing Company or modifications thereof may be employed. Such equipment may be operated at pressures of up to about 20,000 psi to generate the necessary shear stress. The homogenization process may be employed either in a batch or continuous mode, depending on the degree of degradation desired.

The shear stability of a VI improver is determined by a sonic shearing test (ASTM D-2603). The measurement of shear stability used herein is the percent shear loss in viscosity of the oil due to the polymer, abbreviated as % SLDTP. The lower the % SLDTP, the more stable and resistant the additive is against shearing degradation.

The VI of a lubricating oil is a measure of the rate of change of viscosity of a lubricating oil with temperature. The higher the VI, the less the tendency will be for the viscosity of the oil to change as a function of temperature. The VI or VIe is determined from the viscosities of the oil at 100° F. and 210° F. according to ASTM Test D567 or D2270. The D2270 test is used to determine VI above 100, and these VIs are reported as VIe.

The improvement in viscosity achieved with a polymer additive must also be evaluated in conjunction with the amount of the polymer which is added to the lubricating oil to achieve the desired VI improvement. The higher the viscosity index achieved at the lowest percent polymer added to the lubricating oil, the more efficient the polymer additive is as a VI improver.

The low temperature viscosity of a lubricating oil is also important in determining the effectiveness of a VI improver. The low temperature viscosity of a lubricating oil is determined by its borderline pumping temperature (BPT). This BPT is the lowest temperature at which the lubricating oil containing the VI improver can be pumped vertically from the oil sump beneath the engine to the valve deck and other parts requiring lubricating. The BPT is measured by a mini rotary viscometer test (ASTM D-3829) and forms a part of the classification of SAE Viscosity Grades for Engine Oils of SAE J-300, Sept. 80.

I have found that the hydrogenated copolymers of this invention provide excellent VI improvement to lubricating oils at low use levels while providing low BPTs and low % SLDTP. In fact, comparative tests with conventional lubricating oil additives have demonstrated that the hydrogenated copolymers of this invention provide a 35–45 % blending advantage (lower use levels) over conventional polymethacrylate VI improvers with comparable VI, % SLDTP, and BPT. In addition, the hydrogenated copolymers of this invention possess better shear stability (% SLDTP) and better low temperature viscosity (BPT) than conventional ethylene-propylene copolymer VI improvers at lower use levels in lubricating oils than used with ethylene-propylene copolymers. In addition, the hydrogenated copolymers also exhibit improved thermal and oxidative stability over known VI improvers as determined by a standard thermogravimetric analysis technique in air and nitrogen.

The copolymers of this invention may be modified to form multi-function pour point depressant and dispersant VI improvers for lubricating oils and dispersants for hydrocarbon fuels. The pour point is the lowest temperature (° F.) at which an oil will flow (ASTM D-97) and is an important concern in cold weather start-up. A pour point depressant lowers the pour point of a lubricating oil so that it will pour at a lower temperature. The copolymers of this invention may be modified to incorporate pour point depressancy by the inclusion of from 5 to about 100 mole percent of higher alkyl ($C_{12}$–$C_{20}$) methacrylates, and mixtures thereof, in the monomer mixture of the polymerization feed as a percent of total methacrylates. The preferred higher alkyl methacrylates used to incorporate pour point depressancy to the copolymers of this invention include mixtures of $C_{16}$–$C_{20}$ (cetyl, stearyl, and eicosyl) methacrylates, $C_{12}$–$C_{15}$ (dodecyl, tridecyl, tetradecyl, pentadecyl) methacrylates, and mixtures thereof. Mixtures of high carbon number alcohols derived from natural sources may also be used.

The copolymerization technique and hydrogenation process used to prepare these pour point depressant VI improvers is substantially identical to that described above with regard to the preparation of the hydrogenated diolefin-lower alkyl acrylate or lower alkyl methacrylate VI improving copolymers. Hydrogenation of the pour point depressant copolymer, however, requires the use of from about 1.5 to about 2 times the amount of catalyst required to hydrogenate the single-function VI copolymers of this invention. The resulting hydrogenated pour point depressant, VI improving copolymers may contain up to about 5% unsaturation without adversely affecting the solubility and thermal and oxidative stability of the copolymer in lubricating oil. The hydrogenated, pour point depressant, VI improvers exhibit high Viscosity Indices (VIe's) but are slightly less shear stable (% SLDTP) than the non pour point depressant, VI improving copolymers of this invention. The use levels required to achieve high VIe's are significantly less than the levels required for polymethacrylates and are comparable to or slightly higher than the use levels required for conventional ethylene-propylene copolymer additives. The pour point of a base oil is significantly reduced by at least 5° F. and up to about 35° F. by the addition of various amounts of the pour point, VI improving copolymer of this invention to oil.

The VI improvers of this invention can be further modified to incorporate dispersancy. The dispersant, VI improving copolymers and dispersant, pour point depressant VI improvers are preferably prepared by a conventional free-radical initiated, graft polymerization process of a polar, nitrogen-containing graft monomer, for example, N-vinyl pyrrolidone, and 2- or 4-vinyl pyridine, onto the hydrogenated copolymer backbone or substrate. Other possible graft monomers include N,N-dimethylaminoethyl acrylate or methacrylate, 2-methyl-5-vinyl pyridine, vinyl imidazole, and t-butyl aminoethyl acrylate or methacrylate.

The preferred graft polymerization process requires the copolymer to be dissolved in a suitable, inert solvent, such as pale neutral oil or the high alkyl isobutyrates arising from the hydrogenation of high alkyl methacrylates to a concentration of polymer from about 15 to about 80% by weight. Other solvents for the graft reaction include chlorinated aromatics, such as chlorobenzene, o-dichlorobenzene, 1,2,4-trichlorobenzene or alpha-chloronaphthalene, t-butyl benzene, white polymerization oil, cyclohexane, and the like. It may also be possible to perform the graft polymerization in the absence of solvent with the application of intimate, high intensity, mixing, as in a Banbury mixer, sigma blade mixer, or an extruder conventionally used to compound rubbers. The resulting graft copolymers would result in very high solids content on the order of about 80%.

The polymer solution is then stirred and heated to about 110° C. The graft monomer is then blended into the polymer solution. The concentration of the graft monomer is about 2 to about 10% by weight of the hydrogenated copolymer. A free-radical initiator, having a decomposition temperature higher than the temperature of the polymer solution, is then added to the polymer and graft monomer solution. The concentration of the free-radical initiator is about 0.5 to about 2% by weight of the hydrogenated copolymer. The solution of hydrogenated copolymer, solvent, graft monomer, and free-radical initiator is intimately admixed. The reaction temperature is then gradually raised to or above the decomposition temperature of the initiator. In the case of t-butyl perbenzoate initiator, the temperature is raised to about 120°–140° C. The temperature is then maintained or further increased to about 140° to 150° C. to complete the graft polymerization reaction. The reaction usually takes about one to two hours. The reaction product will typically contain essentially no gel and about 0.05 to 0.5% by weight of homopolymerized graft monomers in the form of a haze, and preferably less than about 0.05 to 0.1% by weight. Any gel which is formed is removed by filtration or centrifugation. The final, randomly grafted polymer solution contains about 15 to about 60% by weight solids and from about 0.2 to about 1.0% nitrogen (Kjeldahl analysis). The final graft copolymer can be further diluted in an oil solution to improve handling.

The free-radical initiator is any free-radical source capable of hydrogen abstraction from the hydrogenated copolymer backbone. Examples are alkyl peroxy esters, alkyl peroxides, alkyl hydroperoxides, diacyl peroxides, and the like. While t-butyl perbenzoate is the preferred initiator, other suitable initiators include t-butyl peroctoate, di-t-butylperoxide, t-butyl hydroperoxide, cumene hydroperoxide, benzoyl peroxide, and the like.

While the temperature of the graft polymerization reaction may vary from about 80° C. to about 200° C., it will be understood that the temperature selected will depend on the decomposition temperature of the initiator as well as the composition of the hydrogenated copolymer substrate and graft monomers. Accordingly, it may be possible to run the grafting reaction at a temperature as low as 25° C. or as high as 250° C.

The intimate admixture of the substrate copolymer, graft monomers, and initiator prior to the onset of the graft polymerization reaction and maintaining the temperature below the decomposition temperature of the initiator, at least during the addition and blending of the initiator into the solution, is important to prevent the formation of free-radicals until the reactants are fully and intimately admixed. This procedure eliminates or substantially minimizes the formation of undesirable by-products such as homopolymer, and maximizes the grafting of the polar nitrogen-containing monomer onto the hydrogenated copolymer substrate.

During the grafting reaction, any solvent medium may be used for the preparation of the graft copolymer, provided that the medium is substantially inert to the reactants, that is, the medium has little or no chain transfer capability. The preferred solvent is 100 N oil; however, ortho dichlorobenzene can be useful in some cases.

The graft copolymers of this invention are also useful as dispersants in fuels. In particular, gasoline and middle distillate fuels, such as home heating oils, diesel fuels, and jet fuels, tend to deteriorate oxidatively upon standing and form gummy deposits. The graft copolymers of this invention will disperse such deposits, thus preventing deterioration in fuel quality.

The activity of any given polymer as a dispersant can be determined by an Asphaltenes Dispersancy Test. This test determines the capacity of the polymer to disperse asphaltenes in a typical mineral oil. The asphaltenes are obtained by oxidizing a naphthenic oil with air under the influence of a trace of iron salt as catalyst, such as ferric naphthalenate. The oxidation is desirably accomplished at 175° C. for approximately 72 hours by passing a stream of air through a naphthenic oil to form a sludge which may be separated by centrifuging. The sludge is then freed from oil by extracting it with pentane. It is then taken up with chloroform and the resulting solution is adjusted to a solids content of about 2% weight by volume.

When a polymer is to be examined for its dispersing activity, it is dissolved in a standard oil, such as a solvent-extracted 100 neutral oil. Blends may be prepared to contain percentages varying from about 2% to about 0.01%, or lower, polymer in oil.

A 10 ml. sample of a blend is treated with 2 ml. of the standard solution of asphaltenes in chloroform. The sample and reagent are thoroughly mixed in a test tube and the tube is placed in a forced draft oven at either 90° C. or 150° C. for two hours to drive off volatile material. The tube is then allowed to cool and the appearance of the sample is noted.

If the polymer has dispersing activity, the oil will appear clear although colored. Experience has demonstrated that, unless a polymer exhibits dispersing activity, at concentrations below about 2% in the above test, it will fail to improve the cleanliness of engine parts in actual engine tests. If 2% polymer in oil is needed to pass the asphaltenes dispersancy test, the polymer is rated as 1P. If 1% polymer in oil is needed to pass, the polymer is rated 2P. At 0.5% polymer, the rating is 3P; at 0.25% the rating is 4P; at 0.12% the rating is 5P; and at 0.06% the rating is 6P.

The dispersant, pour point depressant, graft copolymers of this invention exhibit high VIe's at use level concentrations higher than that required for the hydrogenated VI improvers or the hydrogenated, pour point depressant VI improvers of this invention, but exhibited an asphaltenes dispersancy ratings of from 1P to 6P, indicating that they are effective multi-functional, dispersant, pour point depressant, VI improvers for lubricating oil.

Other additives may be added to the lubricating oil containing the VI improvers, pour point depressant VI improvers, and dispersant VI improvers of this invention to provide additional dispersancy, viscosity-temperature control, pour point depressancy, high temperature detergency, rust inhibition, anti-wear agents, anti-oxidants, extreme pressure agents, friction modifiers, anti-foam agents, or dyes. Accordingly, there may be used with the products of this invention polybutene-based succinimides or esters, phosphosulfurized polybutenes, polyacrylates, or polymethacrylates, polyisobutylene, ethylene-propylene copolymers or terpolymers, hydrogenated styrene-butadiene or styrene-isoprene, N-vinylpyrrolidinone or dimethyl amino ethyl methacrylate-containing copolymers with methacrylates, styrene polyesters, ethylene-vinyl acetate copolymers or oligomers, dialkyl fumarate polymers or copolymers, esterified styrene-maleic anhydride copolymers or oligomers, hydrocarbon wax-naphthalate condensate of the Friedel-Crafts type, chlorinated hydrocarbons, alkaline earth sulfonates, phenates, alkylates or phenate sulfides, alkaline earth alkylnaphthalene sulfonates, zinc or other metallic dialkyl dithiophosphates or diaryl dithiophosphates, zinc, cadmium, lead, molybdenum, or other metallic dithiocarbamates, sulfurized or phosphosulfurized esters or terpenes, hindered phenols, phenothiazine or alkylated phenothiazines, naphthyl amines, phenylenediamines, dibenzyl disulfide, sulfurized diisobutylene or tri-isobutylene, trialkyl or triaryl phosphates, tricrecyl phosphate or silicone polymers, and the like.

The following examples are presented to assist those skilled in the art to practice the present invention. The following modes of operation are suggested by way of illustration, all parts and percentages are by weight, and the temperatures are in ° C. unless otherwise specifically noted.

EXAMPLE 1

Preparation 1,3-Butadiene-Methyl Methacrylate Emulsion Copolymer

To a 2 liter Parr reactor equipped with two propeller-type stirrers on the stirring shaft and two inlet ports, a surfactant solution of 600 ml. of deionized water, 0.22 grams sodium lauryl sulfate, 1.71 grams tetrasodium pyrophosphate, and 1.79 grams ferrous sulfate heptahydrate is added. The reactor is thoroughly flushed with nitrogen for 30 minutes while stirring the surfactant solution. 55 ml. of a monomer mixture prepared from 180 grams methylmethacrylate, 325 grams 1,3-butadiene, and 1.00 gram cumene hydroperoxide initiator is added to the reactor. The temperature of the reactor is maintained between +24° C. and +26° C. The remainder of the monomer mixture is added at a rate of 3.0 ml. per minute to the monomer mixture. At the same time that the remainder of the monomer mixture is added, a second surfactant solution of 14.6 grams 70% aqueous Triton X-405 ®, an ethoxylated t-octyl phenol, and 4.4 grams sodium lauryl sulfate in 266 grams of deionized water is added to the reactor at a rate of 1.9 ml. per minute. The addition of the second surfactant solution takes about 2.5 hours to complete. Stirring and temperature are maintained for an additional 4.5 hours after the monomer mixture has been added. Unreacted butadiene is then vented and the emulsion is precipitated in 3 liters of methanol containing 0.2 grams of hydroquinone. The precipitated copolymer is washed with 2 liters of methanol and then with six washes of 3 liter portions of deionized water. The washed, precipitated copolymer is dried in a vacuum for over 24 hours at 35° C. The final, dried copolymer weighs 315 grams and contains 77.8 mole percent 1,3-butadiene as determined by NMR.

EXAMPLES 2–8

Preparation of 1,3-Butadiene-Methyl Methacrylate Emulsion Copolymers in Presence of Chain Transfer Agents The copolymers of these examples are prepared according to the procedure of Example 1 with the inclusion of various chain transfer agents to the monomer mixture, such as n-DDM, t-DDM, and 100 N-oil, at a variety of weight percent concentrations on monomers to control molecular weight. These chain transfer agents are added to the reactor and are mixed with the monomer feed. The copolymer is isolated by precipitation in methanol according to Example 1 (Examples 5 and 8) or by direct extraction at 70° C. into 2 liters of cyclohexane followed by azeotropic distillation to dry the cyclohexane solution and remove methanol (Examples 2–4, 6–7). Extraction generally isolates 50-70% of the copolymer. The remainder can be isolated by precipitation, if desired. Complete isolation by extraction is favored as no redissolution step is required. Polymer yields are measured by evaporating the cyclohexane from a weighed sample.

The properties, mole percent butadiene concentration, and molecular weight determined by gel permeation chromatography (GPC), based on polymethyl methacrylate calibration, are summarized in Table I.

EXAMPLE 9

Hydrogenation of 1,3-Butadiene-Methyl Methacrylate Emulsion Copolymer

The dry copolymer of Example 1 is dissolved in 4 liters of cyclohexane by stirring at 55° C. for 6 hours. Hydrogenation of the copolymer is accomplished in a 2 liter Parr reactor in 3 equal portions by the addition of a catalyst prepared from 1.49 grams of Ni(acac)$_2$ and 7.2 ml. of 25% triethylaluminum in toluene to each portion, pressurizing the reactor to 400 psig, and heating with stirring at 40° C. for one hour. The temperature is then raised to 110° C. for about one-half to about one hour to complete the reaction. The hydrogenated copolymer is freed of catalyst residues by washing twice with 500 ml. of 10% aqueous citric acid at 70° C. and 8 times with 2 liter portions of deionized water. The hydrogenated copolymer is stripped into 100 N-oil, homogenized by four passes at 8000 psig to reduce the molecular weight, and filtered under pressure through a bed of diatomaceous earth. IR and NMR spectra of the final homogenized, hydrogenated copolymer show no absorptions due to double bonds.

EXAMPLES 10–16

The copolymers of Examples 2 through 8 are hydrogenated and freed of catalyst residues according to the procedure of Example 9. At the higher mercaptan levels, 2-3 times the catalyst amount is needed to achieve complete hydrogenation as measured by IR and NMR.

The VI and shear stability properties of the hydrogenated copolymers of Examples 9 through 16 in lubricating oil are summarized in Table II.

EXAMPLE 17

Preparation of 1,3-Butadiene-Ethyl Acrylate Emulsion Copolymer

A first aqueous surfactant mixture containing 294.5 grams deionized water, 1.55 grams sodium lauryl sulfate, 4.87 grams of Triton X-405 ® (70% aqueous) (an ethylene oxide adduct of t-octyl phenol in which the ethylene oxide units average about 40), 0.60 grams ferrous sulfate heptahydrate and 0.57 grams tetrasodium pyrophosphate are added to a 1 liter, three-neck flask equipped with a dry ice condenser, paddle stirrer, dropping funnel, and nitrogen inlet port. The mixture is stirred to form a homogenous solution. The flask is purged with nitrogen while the solution is cooled to 5° C. with ice water. A monomer mixture is prepared from 60.0 grams ethyl acrylate, 112.0 grams 1,3-butadiene and 0.34 grams n-dodecyl mercaptan (0.2 weight percent on monomers), and 0.34 grams cumene hydroperoxide (0.2 weight percent on monomers). When the aqueous solution reaches 5° C., 20 ml. of the monomer mixture is added to the flask and the reactants are stirred vigorously. Once the initial 20 ml. of monomer mixture emulsifies, the remainder of the monomer mixture is added dropwise to the flask over one hour. The temperature of the flask reactants is maintained between 3° and 7° C. by cooling with ice water. At the end of seven and one half hours the copolymer is isolated by precipitation in 2 liters of methanol containing 0.2 grams hydroquinone. The precipitated copolymer is washed once with fresh methanol and is then added to 1.5 liters of cyclohexane. The copolymer is stirred at 50° C. until dissolved in the cyclohexane and the solution is freed of entrained water and methanol by azeotropic distillation. Gravimetric determination of the solids content of the cyclohexane-copolymer solution gives a polymer yield of 29 grams. NMR analysis of the composition shows that the copolymer contains 79.6 mole percent 1,3-butadiene.

EXAMPLE 18

Hydrogenation of 1,3-Butadiene-Ethyl Acrylate Copolymer

The 1,3-butadiene-ethyl acrylate copolymer prepared according to Example 17 is hydrogenated according to the procedure of Example 8. Catalyst residues are removed by extraction with 20% aqueous citric acid. Both IR and NMR spectra of the final hydrogenated copolymer show the absence of unsaturation. GPC determination of molecular weight (polymethylmethacrylate calibration) gives a $\overline{M}w=6.5\times10^5$, e,ovs/M/n$=1.8\times10^5$, and $\overline{M}w/\overline{M}n=3.56$. The performance of the hydrogenated copolymer as a VI improver is illustrated in Table II. This hydrogenated 1,3-butadiene-ethyl acrylate copolymer exhibits high VIe's comparable to the hydrogenated 1,3-butadiene-methyl methacrylate copolymer of Example 11 at the same use level in base oil.

EXAMPLE 19

Preparation of 1,3-Butadiene-Butyl Acrylate Emulsion Copolymer

A 1,3-butadiene-butyl acrylate copolymer is prepared according to the procedure of Example 17 using the same amount of butyl acrylate as ethyl acrylate. The copolymer yield is 41 grams and contains 84.6 mole percent 1,3-butadiene by NMR.

EXAMPLE 20

Hydrogenation of 1,3-Butadiene-Butyl Acrylate Copolymer

The 1,3-butadiene-butyl acrylate copolymer prepared according to Example 19 is hydrogenated and isolated according to Example 18 with the exception that 1 ml. of 30% aqueous hydrogen peroxide is added to the aqueous citric acid solution to speed up isolation. Both IR and NMR spectra of the final copolymer show no olefinic absorptions (no unsaturation). GPC gives $\overline{M}w=9.3\times10^5$, $\overline{M}n=1.6\times10^5$, and $\overline{M}w/\overline{M}n=5.7$ (relative to polymethylmethacrylate). The performance of this copolymer as a VI improver is illustrated in Table II. The hydrogenated 1,3-butadiene-butyl acrylate copolymer exhibited high VIe comparable to 1,3-butadiene-ethyl acrylate copolymer of Example 18 and the 1,3-butadiene-methyl methacrylate copolymer of Example 11 at a slightly lower use level in base oil.

EXAMPLE 21

Preparation of Isoprene-Methyl Methacrylate Emulsion Copolymer

An isoprene-methyl methacrylate copolymer is prepared according to Example 17, except that the polymerization temperature is maintained between 25°–28° C. by cooling with ice water. The quantities of the reactants are as follows: 50 grams isoprene, 28 grams methyl methacrylate, 0.16 grams n-dodecyl mercaptan, 0.16 grams cumene hydroperoxide, 150 ml. deionized water, 0.30 grams ferrous sulfate heptahydrate, 0.28 grams tetrasodium pyrophosphate, 0.78 grams sodium lauryl sulfate, and 2.43 grams Triton X-405 ® (70% aqueous). 12 grams of the copolymer are recovered and the NMR spectrum of the copolymer shows that the copolymer contains 66.7 mole percent isoprene.

EXAMPLE 22

Hydrogenation of Isoprene-Methyl Methacrylate Copolymer

The isoprene-methyl methacrylate copolymer of Example 21 is hydrogenated and catalyst residues are removed according to the procedure of Example 20. The copolymer requires twice the amount of catalyst and is allowed to react twice as long as in Example 20; however, the final copolymer exhibits some unsaturation by IR and NMR. Integration of the NMR spectrum shows that about 35% of the isoprene double bonds remain. The performance of this copolymer as a VI improver is illustrated in Table II. Although the use level of this copolymer is higher than the butadiene-methyl methacrylate, ethyl, or butyl acrylate copolymers, VIe was much higher due to the lower viscosity at 100° F.

EXAMPLE 23

Preparation of 1,3-Butadiene-Methyl Methacrylate-Cetyl-Eicosyl Methacrylate-Dodecyl-Pentadecyl Methacrylate Emulsion Copolymer 883.4 ml. of deionized water, 4.62 grams sodium lauryl sulfate, 12.20 grams Triton N-100 ® (an ethoxylated dodecyl phenol in which the number of ethylene oxide units averages 9.5), 1.71 grams tetrasodium pyrophosphate, 1.79 grams ferrous sulfate heptahydrate, 105 grams of cetyl-eicosyl methacrylate, 165 grams of dodecyl-pentadecyl methacrylate, and 92 grams of 1,3-butadiene are charged to a 2 liter Parr reactor. The mixture is maintained at a temperature of 28-36° C., and 30 grams of methyl methacrylate, containing 1.00 grams of cumene hydroperoxide dissolved in it, are continuously fed into the constantly stirred reactor over a 3 hour period. At the end of the methyl methacrylate and catalyst addition the reaction mixture is stirred for 5 hours. The reactor contents are then discharged into 2 liters of methanol containing 1.10 grams of hydroquinone to precipitate the copolymer. The precipitated copolymer is washed with 2 liters of fresh methanol and then dissolved in 2 liters of cyclohexane. Water and methanol are removed by azeotropic distillation to a volume of about 1.5 liters (1200 grams). The solids content of the copolymer in cyclohexane is 5.5%, representing a copolymer yield of 66 grams.

EXAMPLE 24

Hydrogenation of 1,3-Butadiene-Methyl Methacrylate-Higher Alkyl Methacrylate Copolymer The copolymer of Example 23 is hydrogenated according to Example 15 but with twice the amount of catalyst. The IR of the hydrogenated copolymer, after the removal of catalyst residues, suggests that some trans double bonds may remain but the NMR spectrum shows no olefinic protons. This indicates that at least 95% of the unsaturation is reduced. The ASTM pour points of blends formulated with this hydrogenated pour point VI improver are shown in Table III, while the VI properties are illustrated in Table II.

EXAMPLE 25

Preparation of Dispersant, Pour Point Depressant, VI Improver 60.7 grams of a solution of the hydrogenated 1,3-butadiene-methyl methacrylate-higher alkyl methacrylate copolymer of Example 24 in a solvent of high alkyl isobutyrates arising from the hydrogenation of the high alkyl methacrylates, where the solution contains about 50% solids, is added to a three-neck, round-bottom flask equipped with a mechanical stirrer, a nitrogen inlet port, and a thermometer. The polymer solution is heated to 110° C. and 4.55 grams of N-vinyl pyrrolidinone (NVP) (15% by weight of polymer) graft monomer is added. The solution is stirred at 110° C. for 15 minutes and 0.72 grams of 85% t-butyl-perbenzoate (0.2% on polymer substrate) (in mixed xylenes) is added to the polymer solution. The solution is stirred for 0.5 hour at 110° C. The reaction temperature is then raised at 10° C. intervals over 0.5 hours to 140° C. and held at this temperature for one hour to complete the graft polymerization reaction. The reaction mixture is then heated to 155° C. at 0.5 mm pressure to distill volatiles and diluted with 100 N-oil. Gel which is visible in the oil is removed by filtration. The solution of graft polymer containing 11.7% solids was tested by asphaltenes dispersancy and was found to have a 4P rating. The performance of the graft polymer as a VI improver is illustrated in Table II, and as a pour point depressant in Table III.

EXAMPLE 26

Preparation of Dispersant, Pour Depressant, VI Improver 10.87 grams of the hydrogenated copolymer of Example 24 isolated from the cyclohexane hydrogenation solvent is precipitated in methanol and added to a 250 ml. three-neck, round-bottom flask equipped with a mechanical stirrer, thermometer, and nitrogen inlet port. 29.3 grams of pale neutral oil is added to the hydrogenated copolymer. The reaction flask is thoroughly flushed with nitrogen and the solution is stirred at 120° C. for about 4 hours until the polymer dissolves. 0.82 grams of the N-vinyl pyrrolidinone (7.5% by weight of polymer) graft monomer is added to the reaction flask. After 15 minutes of stirring, 0.25 grams of 85% t-butyl-perbenzoate initiator in mixed xylenes is added to the flask. The temperature is maintained at 120° C. for 0.5 hours and is then raised to 140° C. at 15 minute intervals. The temperature is held at 140° C. for 1 hour to complete the graft polymerization reaction. Additional 100 N-oil is added and volatiles are removed by stripping to a temperature of 155° C. at 0.5 mm pressure. The hot oil polymer solution is filtered through cheese cloth to remove gel particles and results in a 5.0% polymer solution in oil. The graft copolymer is a 1P asphaltenes dispersant. Its VI improving properties are shown in Table II, and its pour point depressant properties in Table III.

EXAMPLE 27

Preparation of 1,3-Butadiene-Higher Alkyl Methacrylate Emulsion Copolymer

The procedure of Example 1 is repeated to prepare 43 grams of copolymer from a monomer mix containing 100 grams 1,3-butadiene, 210 grams dodecyl-pentadecyl methacrylate, 70 grams cetyl-eicosyl methacrylate, and 1.00 grams of cumene hydroperoxide. All other reagent quantities are as described in Example 1.

The copolymer contains 87 mole percent butadiene.

EXAMPLE 28

Hydrogenation of Copolymer of Example 27

The copolymer of Example 27 is hydrogenated in cyclohexane according to the procedure of Example 8. The IR spectrum suggests some saturation, but the NMR spectrum shows no olefinic absorptions, indicating at least 95% of the double bonds have been hydrogenated. The properties of the hydrogenated copolymer as a VI improver and as a pour point depressant are illustrated in Tables II and III, respectively.

EXAMPLE 29

Preparation of Dispersant, Pour Point Depressant, VI Improver 10.73 grams of the hydrogenated copolymer in a solution of 33 grams 100 N-oil and 11.3 grams of mixed high alkyl isobutyrates are graft polymerized with 1.65 grams N-vinyl pyrrolidinone according to the procedure of Example 25. Very little gel is formed. The product is a 1P asphaltenes dispersant. The graft copolymer contains 0.10% N. The VI properties and pour depressancy are illustrated in Table III.

EXAMPLE 30

Preparation of Dispersant VI Improver

A solution of 19.0 grams of a hydrogenated butadiene/methylmethacrylate copolymer prepared according to Example 1 in 31.0 grams of 100 N-oil (38% solids) is charged to a glass reactor, flushed with nitrogen, and heated to 110° C. 1.43 grams of N-vinyl pyrrolidinone (7.5% on polymer solids) is added to the copolymer solution, and the solution is stirred for 15 minutes. The temperature is then raised to 140° C. over a 30 minute period and held at 140° C. for one hour. The solution is stripped at 0.5 mm pressure and 145° C. while adding additional 100 N-oil. The final product is a 11.5% solution of dispersant VI improver in 100 N-oil which gives a 6P dispersancy rating. Column chromatography shows that 79% of the polymer has been grafted. Microanalysis of the solid polymer gives % $N_k$=0.89 corresponding to an average N-vinyl pyrrolidinone content of 7.1%.

The following tables illustrate the VI improvement, shear stability, oxidative and thermal stability, BPT, pour point depressancy, and dispersancy of the copolymers of this invention.

weight of the copolymer and the $\overline{Mw}/\overline{Mn}$ is significantly higher than when n-dodecyl mercaptan is used as a chain transfer agent.

Precipitation is favored over extraction as it allows for recovery of all the copolymer, whereas extraction allows recovery of only about 50 to 70% of the copolymer. The butadiene concentration in the copolymer is very close to the concentration of butadiene in the feed, an indication of very low concentration drift.

Table II illustrates the VIe and % SLDTP of the copolymers of Examples 9–16, 18, 20, 22, 24–26, 28, and 29 as compared to base oil. The highest VIe is achieved with the isoprene/MMA copolymer of Example 22; however, the use level and % SLDTP is higher than with Bd/MMA (Example 11). The most shear stable copolymer is Example 16, while Example 28 is the least shear stable.

TABLE II

| Example | Base Oil | % Polymer | 5' Sonic % SLDTP | Viscosity CST at 210° F. | Viscosity CST at 100° F. | VIe |
|---|---|---|---|---|---|---|
|  | Base Oil[1] | none | 0 | 6.41–6.77 | 40.20–46.91 | 120–108 |
| 9 | Bd/MMA | 0.93 | 16 | 14.30 | 108.16 | 145 |
| 10 | Bd/MMA | 0.85 | 32 | 14.81 | 111.26 | 148 |
| 11 | Bd/MMA | 0.73 | 37 | 14.20 | 100.05 | 155 |
| 12 | Bd/MMA | 1.30 | 12 | 14.36 | 98.06 | 161 |
| 13 | Bd/MMA | 1.39 | 14 | 14.89 | 111.48 | 149 |
| 14 | Bd/MMA | 0.85 | 37 | 14.48 | 89.43 | 179 |
| 15 | Bd/MMA | 0.88 | 28 | 13.78 | 95.11 | 157 |
| 16 | Bd/MMA | 1.51 | 10 | 14.76 | 114.43 | 143 |
| 18 | Bd/EA | 0.73 | 38 | 14.37 | 106.71 | 148 |
| 20 | Bd/EA | 0.59 | 46 | 13.64 | 101.82 | 144 |
| 22 | Isoprene/MMA | 1.24 | 41 | 14.43 | 66.46 | 240 |
| 24 | Bd/MMA/HAM[2] | 1.43 | 54 | 15.84 | 107.72 | 167 |
| 25 | Bd/MMA/HAM | 1.50 | 53 | 15.44 | 100.98 | 172 |
| 26 | Graft Copolymer | 1.39 | 41 | 14.73 | 97.04 | 168 |
| 28 | Bd/HAM | 0.96 | 66 | 12.95 | 91.45 | 150 |
| 29 | Graft Bd/HAM | 1.48 | 46 | 16.37 | 119.79 | 157 |

[1]Base oil contains 4.0% ashless dispersant, 8.2% detergent/inhibitor package, 60–87% 150 Neutral oil, and remainder 100 Neutral oil.
[2]HAM = Higher alkyl methacrylate Table III illustrates the pour point depressancy of the copolymers of Examples 24, 25, 26, 28, and 29. All these copolymers exhibited at least a 10° F. pour point reduction over base oil and can result in as high as a 25° F. reduction.

TABLE III

Pour Point Depressancy of Hydrogenated Copolymers

TABLE I

| Example | Chain Transfer Agent | Weight % on Total Monomers | Copolymer Yield (Grams) | Recovery Method | Mole % 1,3-Butadiene in Copolymer[1] | GPC[2] Mw × 10⁶ | Mn × 10⁵ | $\overline{Mw}/\overline{Mn}$ |
|---|---|---|---|---|---|---|---|---|
| 2 | n-DDM | 0.1 | 135 | Extraction | 75.3 | 0.11 | 0.13 | 8.8 |
| 3 | n-DDM | 0.2 | 138 | Extraction | 76.2 | 5.5 | 1.9 | 29.0 |
| 4 | n-DDM | 0.3 | 225 | Extraction[3] | 72.2 | 0.32 | 0.84 | 3.9 |
| 5 | n-DDM | 0.4 | 188 | Precipitation | 74.7 | 0.39 | 1.0 | 3.8 |
| 6 | 100 N-oil | 5.0 | —[4] | Extraction | 76.5 | 8.4 | 2.1 | 40.0 |
| 7 | 100 N-oil | 10.0 | —[4] | Extraction | 73.0 | 8.7 | 1.9 | 47.0 |
| 8 | t-DDM | 0.4 | 282 | Precipitation | 77.3 | —[5] | —[5] | —[5] |

[1]By NMR (mole % 1,3-butadiene in feed was 77%)
[2]Polymethyl methacrylate reference
[3]Toluene extraction and hydrogenation solvent
[4]Contains gel; soluble polymer yield not determined
[5]Hydrogenated copolymer had Mw = 2.2 NO⁵, Mn = 8.8 × 10⁴, and $\overline{Mw}/\overline{Mn}$ = 2.5.

Table I presents a summary of the results of Examples 2–8. Examples 2–5 show that, as the concentration of the chain transfer agent is increased, the molecular weight distribution generally becomes narrower. Examples 6 and 7 show that 100 N-oil is not a very active chain transfer agent and the weight average molecular

| Example | % Polymer | Viscosity CST 210° F. | ASTM Pour Point, °F. |
|---|---|---|---|
| Base Oil[1] | none | 6.41–6.77 | −5, −10 |
| 24 | 0.90 | 11.66 | −15 |

TABLE III-continued

Pour Point Depressancy of Hydrogenated Copolymers

| Example | % Polymer | Viscosity CST 210° F. | ASTM Pour Point, °F. |
|---|---|---|---|
| 24 | 1.43 | 15.84 | −20 |
| 25 | 1.50 | 15.44 | −30 |
| 26 | 1.39 | 14.73 | −35 |
| 28 | 0.30 | 7.80 | −25 |
| 28 | 0.60 | 8.66 | −30 |
| 29 | 1.48 | 16.37 | −30 |

[1]Base oil contains 4.0% ashless dispersant, 8.2% detergent/inhibitor package, 60–87% 150 Neutral oil, and remainder 100 N-oil.

Table IV compares the viscometric properties of the hydrogenated butadiene-methyl methacrylate copolymers of this invention with other conventional VI improvers. The copolymers of this invention exhibit VIe's comparable to the conventional VI improvers at use levels ranging from 35–45% lower than polymethacrylates to about 10% higher than dispersant ethylene-propylene copolymers. The BPT's of the copolymers of this invention are equivalent to polymethacrylates and are better than the BPT's of the ethylene-propylene and dispersant ethylene-propylene copolymers. In addition, the VIe's are much higher than the VIe's of the copolymers of the British '749 patent at lower use levels (Example 1 homogenized 4 passes). Furthermore, the shear stability of the Bd/MMA copolymers are superior to commercially available ethylene-propylene copolymers and equivalent to or better than polymethacrylates.

TABLE IV

Comparison of Viscometric Properties of Hydrogenated Butadiene-Methyl Methacrylate Copolymers with other VI Improvers[1]

| Polymer Type | % Polymer | Viscosity, CST 210° F. | Viscosity, CST 100° F. | VIe | % SLDTP 10 hr L-38 | PPT (°C.) |
|---|---|---|---|---|---|---|
| Polymethacrylate | 2.81 | 14.75 | 95.70 | 171 | 20 | −32.7 |
| Hydrog. Styrene-Isoprene | 0.83 | 14.42 | 104.60 | 152 | 20 | −29.6 |
| Ethylene-Propylene | 1.02 | 15.19 | 104.22 | 151 | 30 | −30.5 |
| Dispersant, EP[5] | 0.85 | 14.70 | 111.54 | 146 | 20 | −28.5 |
| Example IX, Br. '749 | 1.00 | 11.37 | 92.67 | 120 | NP[4] | NP[4] |
| Example X, Br. '749 | 1.00 | 12.12 | 101.45 | 121 | NP[4] | NP[4] |
| Example 1[2] | 0.93 | 14.30 | 108.16 | 145 | 24 | −33.6 |
| Example 1[3] | 1.24 | 14.31 | 113.54 | 137 | 14.5 | −30.0 |

[1]Base oil formulation contains 4.0% ashless dispersant, 8.2% detergent/inhibitor package, and a mixture of 150 and 100 Neutral oil to give a Cold Cranking Simulator (C.C.S.) (ASTM D-2602) (low temperature viscosity at high shear) viscosity of less than 35 poise at −20° C. for full formulation (SAE J-300 Sept. '80).
[2]Homogenized 4 passes at 8000 psig
[3]Homogenized 8 passes at 8000 psig
[4]NP = Not reported
[5]Dispersant ethylene-propylene copolymer Table V shows the thermal stability of various VI improvers. The copolymers of this invention are more thermally stable in air than the conventional VI improvers and are generally more stable in nitrogen than the commercial VI improvers, except for hydrogenated styrene/isoprene at $T_{50}$.

TABLE V

TGA Data on Various VI Improvers

| Polymer | $T_{10}$[5] Air | $T_{10}$[5] N$_2$ | $T_{20}$[5] Air | $T_{20}$[5] N$_2$ | $T_{50}$[5] Air | $T_{50}$[5] N$_2$ |
|---|---|---|---|---|---|---|
| EP[1] | 347 | 367 | 360 | 383 | 377 | 392 |
| HSI[2] | 312 | 374 | 343 | 424 | 396 | 460 |
| Ex. 1[3] | 367 | 397 | 396 | 433 | 426 | 452 |
| Ex. 1[4] | 372 | 398 | 402 | 435 | 445 | 470 |

[1]Ethylene-propylene, sold by B. F. Goodrich as Epcar 506 ®
[2]Hydrogenated styrene-isoprene, sold by Shell Company as Shellvis 40 ®
[3]4 pass homogenized
[4]8 pass homogenized
[5]$T_{10}$, $T_{20}$, and $T_{50}$ are temperatures, °C., at which 10, 20, and 50% of the polymer has been volatilized or lost as measured by the reduction in weight of the test sample. The heating rate employed in the thermogravimetric test was 20° C./minute.

What is claimed is:

1. A lubricating oil containing a viscosity index improving amount of a substantially hydrogenated, random copolymer comprising the polymerized product of a conjugated diolefin having six carbon atoms or less per molecule, and a lower alkyl acrylate or lower alkyl methacrylate where the alkyl group contains eight carbon atoms or less per molecule.

2. The lubricating oil of claim 1 where the conjugated diolefin is 1,3-butadiene and where said random copolymer comprises at least 71 mole percent 1,3-butadiene and less than 29 mole percent of said lower alkyl acrylate or lower alkyl methacrylate.

3. The lubricating oil of claims 1 or 2 where said lower alkyl methacrylate is methyl methacrylate.

4. The lubricating oil of claim 1 where said conjugated diolefin is isoprene.

5. The lubricating oil of claim 1 where said lower alkyl acrylate is selected from the group consisting of methyl, ethyl, and butyl acrylate.

6. The lubricating oil of claim 1 where said conjugated diolefin is 1,3-butadiene, said lower alkyl methacrylate is methyl methacrylate, and where the concentration of said hydrogenated, copolymer in said lubricating oil ranges from 0.5 to 5.0 percent by weight.

7. The lubricating oil of claim 1 having a borderline pumping temperature less than about −30° C.

8. The lubricating oil of claim 1 being stable to mechanical shearing and thermal degradation.

9. A process for preparing a hydrogenated, random copolymer effective as a viscosity improving additive for lubricating oils comprising the steps of emulsion copolymerizing a conjugated diolefin having six carbon atoms or less per molecule with a lower alkyl acrylate or lower alkyl methacrylate, where the alkyl group contains eight carbon atoms or less per molecule, in an aqueous surfactant solution in the presence of a catalyst at a polymerization temperature of from about 5° to 40° C. to form a random copolymer, and catalytically hydrogenating said random copolymer in the presence of a hydrogenation catalyst at a pressure of from about 100 to about 500 psig to substantially reduce all the diolefin unsaturation of said random copolymer.

10. A fully hydrogenated, random copolymer having a molecular weight of from about 80,000 to about one million comprising the polymerized product of at least 71 mole percent of a conjugated diolefin, having six carbon atoms or less per molecule, and less than 29 mole percent of a lower alkyl acrylate or lower alkyl methacrylate, where the alkyl group contains eight carbon atoms or less per molecule, and where the fully hydrogenated random copolymer is soluble in oil at temperatures lower than 50° C. and is free from crosslinking as determined by a reciprocal swelling volume of less than about 0.01 to 0.005 in a suitable solvent.

11. The hydrogenated copolymer of claim 10 where the conjugated diolefin is 1,3-butadiene and the lower alkyl methacrylate is methyl methacrylate.

12. The hydrogenated copolymer of claim 10 where the conjugated diolefin is isoprene.

13. The hydrogenated copolymer of claim 10 where said lower alkyl acrylate is selected from the group consisting of methyl, ethyl, and butyl acrylate.

14. The substantially hydrogenated copolymer prepared according to the process of claim 1.

15. The process of claim 9 where the hydrogenation catalyst is selected from the group consisting of salts of anhydrous nickel, anhydrous iron, and anhydrous cobalt, triisobutylaluminum, n-butyllithium and trimethyl aluminum.

* * * * *

UNITED STATES PATENT AND TRADEMARK OFFICE
CERTIFICATE OF CORRECTION

PATENT NO. : 4,533,482

DATED : August 6, 1985

INVENTOR(S) : Joseph M. Bollinger

It is certified that error appears in the above-identified patent and that said Letters Patent is hereby corrected as shown below:

Column 8, lines 38 and 39 delete "The remains as determined by NMR and/or IR spectra."

Column 18, line 49 change the word "saturation" to --unsaturation--.

Table IV, Heading "PPT($^{\circ}$C)" should read --BPT($^{\circ}$C)--.

Signed and Sealed this

Third Day of December 1985

[SEAL]

Attest:

DONALD J. QUIGG

Attesting Officer

Commissioner of Patents and Trademarks